Sept. 9, 1924.　　　　　　　　　　　　　　　　1,508,365
A. R. LUKENS, JR., ET AL
METHOD OF CUTTING OUT STRIP SHINGLE UNITS
Filed July 6, 1920

INVENTORS:
Alan R. Lukens Jr.
Charles L. Keller
BY
ATTORNEYS.

Patented Sept. 9, 1924.

1,508,365

UNITED STATES PATENT OFFICE.

ALAN R. LUKENS, JR., AND CHARLES L. KELLER, OF WYOMING, OHIO.

METHOD OF CUTTING OUT STRIP-SHINGLE UNITS.

Application filed July 6, 1920. Serial No. 394,321.

*To all whom it may concern:*

Be it known that we, ALAN R. LUKENS, Jr., and CHARLES L. KELLER, citizens of the United States, and residents of Wyoming, in the county of Hamilton and State of Ohio, have invented a certain new and useful Method of Cutting Out Strip-Shingle Units, of which the following is a full, clear, and exact description, reference being had to the drawings forming part of this specification.

Our invention relates to methods of cutting out shingle strip units, by which is meant the lengthwise cutting from a sheet of material of serrated or irregular edges in longitudinal or transverse sections from the material, and subsequent cutting them crosswise into separate units or pieces, for shipment and laying.

It is a comparatively easy matter to cut out a shingle strip from a piece of material for use as a whole on a roof, but to cut it across for use in separate units, without resulting in exposure to the roof, is considerable of a problem in instances where the serrations of the edges to be exposed are of such width as to expose a substantial portion of underlying strips in underlying courses.

In the patent of Alan R. Lukens, Jr., No. 1,348,503, dated August 3, 1920, is set forth a method of cutting out strip shingles, and in the patent of Charles L. Keller, No. 1,348,498, dated August 3, 1920, is set forth another method of cutting out strip shingles.

The Lukens patent illustrates a method of cutting out strip shingles by forming a row of spaced cut-outs in a piece of roofing material, said spaced cut-outs being of a size sufficient to form an individual shingle, and the spacing to be such as to leave considerable material between each cut-out. A slitting through the cut-outs of the interlying material then results in forming two serrated edges of special nature for two lengthy shingle strips.

In cutting across these lengthy strips Lukens in his said patent calls for a transverse cut, resulting in forming pieces made up of one or more L-shaped units, and resulting in forming lefts and rights in the said units.

In the Keller patent referred to, which has also been duly allowed, the method of cutting out consisted in forming a serrated line through a lengthwise piece and cutting across to form units by means of cuts which bisected the half pieces so formed at the center of the cut-outs in the edges thereof. This he had to accomplish by means of staggered cross cuts made first one side and then the other of the piece.

In the present case, in which both Lukens and Keller join as joint inventors, the process of cutting out is a combination of the two processes set forth in said two patents. Thus the cut-out of shingle sized pieces in spaced relation lengthwise or crossways of a piece of roofing material is followed and then the cross cuts are made so as to bisect the portions from which the shingle pieces have been cut away. By so combining the methods of cutting, we thereby eliminate the use of rights and lefts, which while practical is not so simple in laying as a piece which has extensions at both ends, and at the same time we save all of the material in the roofing piece for practical use. Indeed due to the fact that the wide spacing effect is gained by our method of cutting out shingles, thereby saving material in the roof, we produce individual shingles which are a clear saving over any process of cutting in the past, and at the same time have units for laying all of which are alike.

Figure 1:
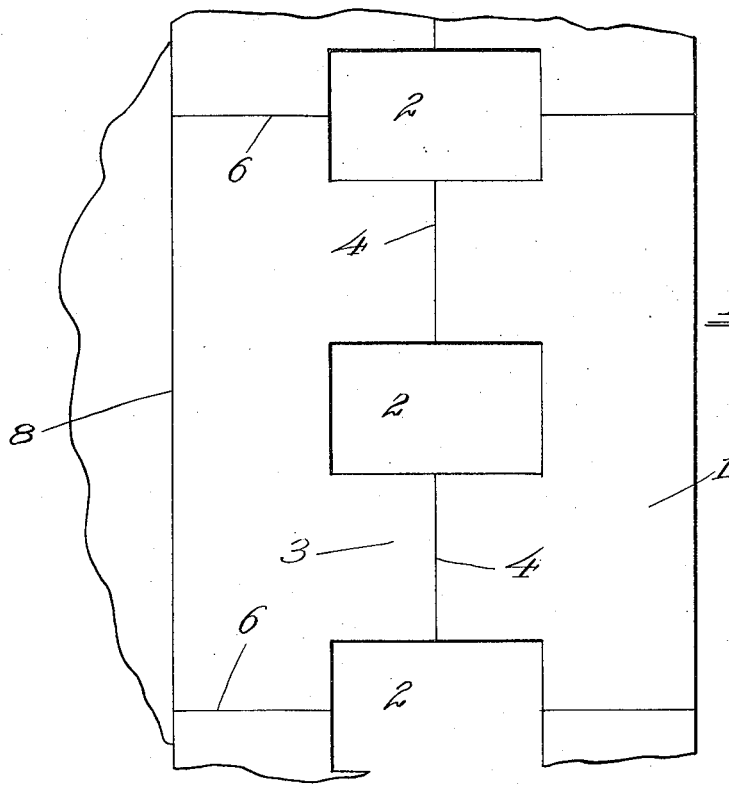
Figure 1 is a plan view showing the cutting out from the roofing piece.

The piece of roofing 1 may be taken as representing a crosswise or lengthwise piece of roofing material of a width to produce two sets of shingle strip units. It will be understood that much wider or much longer pieces will in fact be employed and the work done merely multiplied over and above the work shown on the piece that is illustrated.

The means for making the cuts are not insisted upon by us, and the various lines of cut may be formed with dies over a flat piece, knives on a roll, or in any other way that is desired.

Accordingly we cut from the piece a series of shingle size, or commercial size pieces 2, having preferably a rectangular shape, and space them apart a distance which is either greater or less than the width of the cut-outs, the interlying portions 3 in the instance shown being of greater width than the cut-outs 2.

We also cut through the piece of roofing 1 on lines 4, bisecting the row of cut-outs lengthwise of said row, thereby dividing the two halves of the piece into shingle strips having edges which show shingle-like extensions 5, and body portions 6 (Figure 2), said extensions being wider than the spaces between them.

We also cut across the body portions of material on both sides of the cuts 4, on lines 6 which bisect the spaces where the cut-outs are made, these lines being at substantially a right angle to the lines 4.

Figure 2:
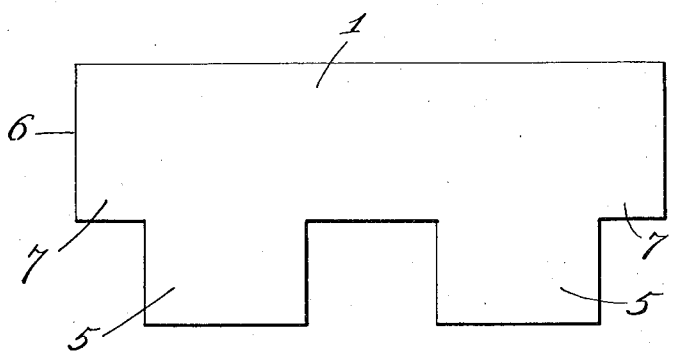
Figure 2 is a plan view of a shingle unit as produced by us.

This results in the ultimate units having body portions which extend out at both ends of the strip free of shingle extensions as at 7, 7, (Fig. 2.).

The number of shingle extensions 5 per unit may vary as desired, although we prefer to have two extensions to each unit and it will be noted that our units may be divided up into T-shaped components, similar to those of the Keller patent above referred to, while the cut-outs are similar to the Lukens patent, and the resultant shingle unit is a combination product alike to both the Keller and the Lukens strip.

Should the roofing piece be either lengthwise or crosswise, as the case may be, of greater width than two shingle units, then an additional cut as at 8, will be made so as to divide the entire piece for a duplication of the operations now described on another double width.

We desire to note that our method of cutting is aimed at the economical and easy provision of a shingle strip unit having a body portion, and interspaced shingle-like extension of preferably different relative widths from the spaces between them, said units all to be of the same shape and size, and to be capable of laying on a roof to gain the varied effects, and economy of material fully set forth in our said patent hitherto referred to.

Having thus described our invention, what we claim as new and desire to secure by Letters Patent, is:—

1. A method of cutting out strip shingle units which consists in cutting from a piece of material a series of interspaced cut-outs, same being of a size suitable for commercial use as a roof covering, and dividing the piece into sections or units by means of lines, extensions of which would bisect the cut out spaces both longitudinally and transversely of the piece for the purpose described but which lines terminate at the margin of the cut out portion.

2. A method of cutting out strip shingle units which consists in cutting from a piece of material a series of interspaced cut-outs, same being of a size suitable for commerical use as a roof covering, and dividing the piece into sections or units by means of lines, extensions of which would bisect the cut out spaces both longitudinally and transversely of the piece but which lines terminate at the margin of the cut out portion, said cut outs being of different relative width from the spaces lying between them, for the purpose described.

3. A method of cutting out strip shingle units which consists in cutting from a piece of material a series of rectangular cut outs having the dimensions of commercial shingles, and dividing the said piece by means of lines, extensions of which would bisect the cut out spaces both longitudinally and transversely but which lines terminate at the margin of the cut out portion.

CHARLES L. KELLER.
ALAN R. LUKENS, Jr.